United States Patent
Nawrot et al.

(10) Patent No.: US 7,858,907 B2
(45) Date of Patent: Dec. 28, 2010

(54) ELECTRIC SWITCHING CIRCUIT FOR A CLOTHES DRYER

(75) Inventors: Thomas Nawrot, Berlin (DE); Bert Peters, Brieselang (DE); Guido Sattler, Falkensee (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 601 days.

(21) Appl. No.: 11/918,708

(22) PCT Filed: Feb. 14, 2006

(86) PCT No.: PCT/EP2006/050921

§ 371 (c)(1), (2), (4) Date: Oct. 16, 2007

(87) PCT Pub. No.: WO2006/117254

PCT Pub. Date: Nov. 9, 2006

(65) Prior Publication Data

US 2009/0077828 A1 Mar. 26, 2009

(30) Foreign Application Priority Data

Apr. 29, 2005 (DE) .................. 10 2005 020 095

(51) Int. Cl.
*H05B 1/02* (2006.01)

(52) U.S. Cl. .................. 219/494; 219/497; 219/511; 236/68 B; 34/321

(58) Field of Classification Search .................. 219/494, 219/497, 511, 501; 236/68 B; 34/467, 321
See application file for complete search history.

(56) References Cited

U.S. PATENT DOCUMENTS

| 4,763,425 | A |   | 8/1988 | Grennan | |
|---|---|---|---|---|---|
| 4,842,192 | A | * | 6/1989 | Range et al. | 236/68 B |
| 5,193,292 | A | * | 3/1993 | Hart et al. | 34/491 |
| 5,673,497 | A | * | 10/1997 | St. Louis | 34/486 |
| 6,700,102 | B2 | * | 3/2004 | St. Louis | 219/511 |
| 2009/0300938 | A1 | * | 12/2009 | Volkers | 34/467 |

FOREIGN PATENT DOCUMENTS

DE   1 585 813   5/1971

(Continued)

OTHER PUBLICATIONS

International Search Report PCT/EP2006/050921.

*Primary Examiner*—Mark H Paschall
(74) *Attorney, Agent, or Firm*—James E. Howard; Andre Pallapies

(57) ABSTRACT

An electric switching circuit with a first current path for operating an electric motor and with a second current path for operating a first heater. The electric motor drives a fan during which an air flow created by the fan is heated by the first heater. A switch for opening or closing the second current path in response to an actual operating state of the electric motor is, in the second current path, connected in series to the first heater. The switch is designed as a bimetallic switch and a second heater is assigned thereto that is arranged and designed for detecting the actual operating state of the electric motor and for controlling the bimetallic switch by changing its ambient temperature in response to the detected operating state.

14 Claims, 2 Drawing Sheets

FOREIGN PATENT DOCUMENTS

| | | |
|---|---|---|
| DE | 25 12 622 | 9/1976 |
| DE | 40 34 273 | 4/1992 |
| DE | 102 39 493 | 3/2004 |
| EP | 0 104 502 | 4/1984 |
| EP | 0 351 276 | 1/1990 |
| EP | 0 371 263 | 6/1990 |
| EP | 0 924 331 | 6/1999 |

* cited by examiner

ELECTRIC SWITCHING CIRCUIT FOR A CLOTHES DRYER

BACKGROUND OF THE INVENTION

The invention relates to an electric switching circuit for controlling a heater preferably for a flow of air in a laundry dryer Laundry drying machines, also known as laundry dryers, have a fan for generating a flow of air and preferably also a heater for heating the flow of air in order to dry laundry. The fan is typically driven by an electric motor. With special operating statuses of the laundry dryer, e.g. with very wet laundry, with a generally high load and/or with high ambient temperatures, there is a risk of the electric motor overheating. In this case, the electric motor is typically automatically disconnected by means of an existing protective circuit. Disconnecting the electric motor nevertheless results in the fan driven by the electric motor then stopping and a flow of air no longer moving through the laundry dryer. In order in this case to prevent the flow of air heater overheating and causing damage to the heater itself, to a heater channel, to the wheel of the fan or to another component, it is usual in the prior art to provide a switch in series with the heater for the flow of air in order to be able to disconnect the heater in response to an actual operating state of the electric motor. It is thus particularly known to immediately disconnect the heater if a failure of the electric motor driving the fan is detected.

This controlled switch is traditionally realized in the form of a relay or centrifugal force switch for instance. The relay is typically connected such that it detects the absence of a current through the electric motor and thereupon opens the switch in series with the heater. The centrifugal force switch detects the absence of a rotation of the electric motor and thereupon switches the switch assigned to the heater open.

The centrifugal force switch is relatively expensive. Simple relays are certainly relatively cost-effective but often fail to meet prescribed safety standards. In contrast, the use of relays, which meet such safety standards, in other words which are designed for instance with materials which meet the stricter requirements placed on flammability and filament testing according to the IEC 60335.4 standard, particularly in the case of devices produced in series such as laundry dryers, represent a cost factor which is not to be ignored.

SUMMARY OF THE INVENTION

Based on this prior art, the object underlying the invention is to further develop a known electric switching circuit, a laundry dryer with this switching circuit and a method for operating the laundry dryer such that it is possible, in a more cost-effective manner, to disconnect a heater for heating a flow of air through the laundry dryer.

The object is achieved by the subject matter of disclosed herein. This is characterized in that the switch is designed as a bimetallic switch and a second heater assigned to the bimetallic switch is provided to detect the actual operating state of the electric motor and to control the bimetallic switch by changing is ambient temperature in response to the detected operating state.

A bimetallic switch with an assigned second heater is nowadays available on the market as a preferably integrated component. There is no need for a particularly expensive embodiment of this component if the safety chain sensor-software-actuator is ensured in a probate manner by correspondingly designing the software. The heater assigned to the bimetallic switch can advantageously be used in suitable circuit and/or arrangement not only to control the bimetallic switch by changing its ambient temperature but also to detect the actual operating state of the electric motor.

The electric motor is advantageously used to drive a fan, which for its part generates a flow of air. The flow of air is used in a laundry dryer to dry laundry. The flow of air is then heated by a first heater.

The second heater can advantageously be used to detect the actual operating state of the electric motor, i.e. in particular to detect whether the electric motor is connected or disconnected, by connecting it in the first current path in series with the electric motor. In particular, the amount of current in the first current path thus then represents the actual operating state of the electric motor.

To this end, the second heater can alternatively also detect the operating state of the electric motor in that it is arranged in the flow of air generated by the fan. If this flow of air is absent, which suggests a disconnected and/or defective electric motor, the second heater is cooled less and more heat can be output into the ambient of the bimetallic switch than in a reverse case when the electric motor is running and operates the fan. This alternative arrangement of the second heater advantageously not only allows the electric motor to be monitored but also the fan and the cooling effect of the flow of air generated by the fan.

Provided the electric motor, the first and/or second heater are designed for an operation with an identical supply voltage, a parallel circuit is applied between the respective paths in which the said components are operated between a common voltage potential and earth.

The above-mentioned object is also achieved by a laundry dryer with the said circuit as well as by a method for operating a laundry dryer of this type. The advantages of these solutions correspond to the above advantages mentioned in respect of the claimed electric switching circuit.

On the whole, the claimed electric switching circuit improves the operating safety of the device in which it is used respectively, in particular a laundry dryer.

BRIEF DESCRIPTION OF THE DRAWINGS

The electric switching circuit according to the invention is described in more detail with reference to two exemplary embodiments illustrated in the drawings, in which.

DETAILED DESCRIPTION OF EMBODIMENTS

Figure 1:
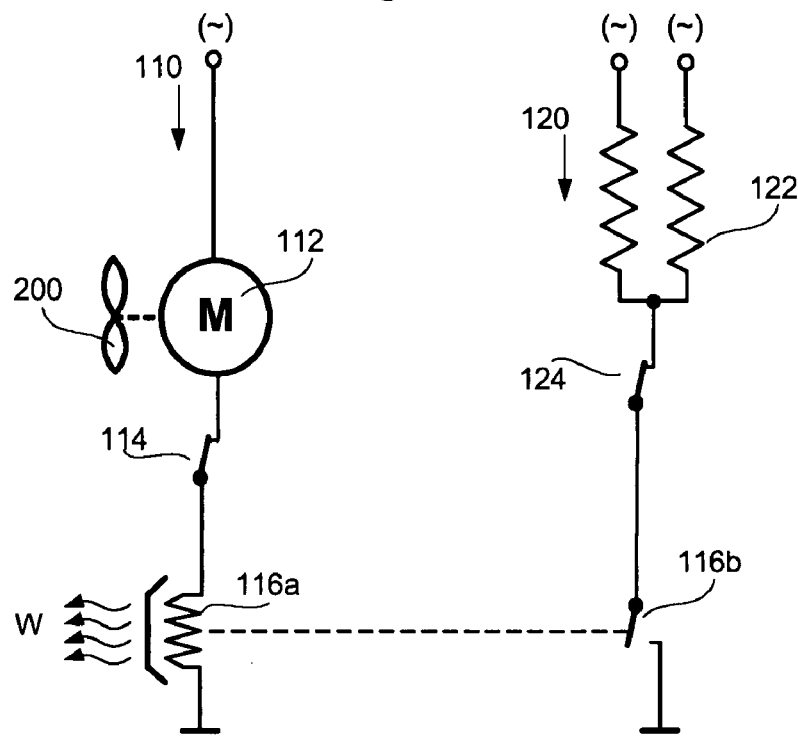
FIG. 1 shows a first exemplary embodiment of the electric switching circuit according to the invention

In both exemplary embodiments illustrated in the said figures, a second heater is used to detect the actual operating state of an electric motor and to control a bimetallic switch by changing its ambient temperatures in response to the detected operating status. The two exemplary embodiments of the electric switching circuit differ only in that the second heater in the electric switching circuit is connected and/or arranged in a different manner in order to detect the actual operating state. In all figures and also with different exemplary embodiments, the same components are designated the same reference characters.

FIG. 1 shows a first exemplary embodiment of the switching circuit according to the invention. It includes two current paths 110 and 120. In the first exemplary embodiment, the first current path 110 includes a series circuit consisting of an electric motor 112 and a protective circuit 114 to protect the electric motor 112 against overload.

Figure 3:
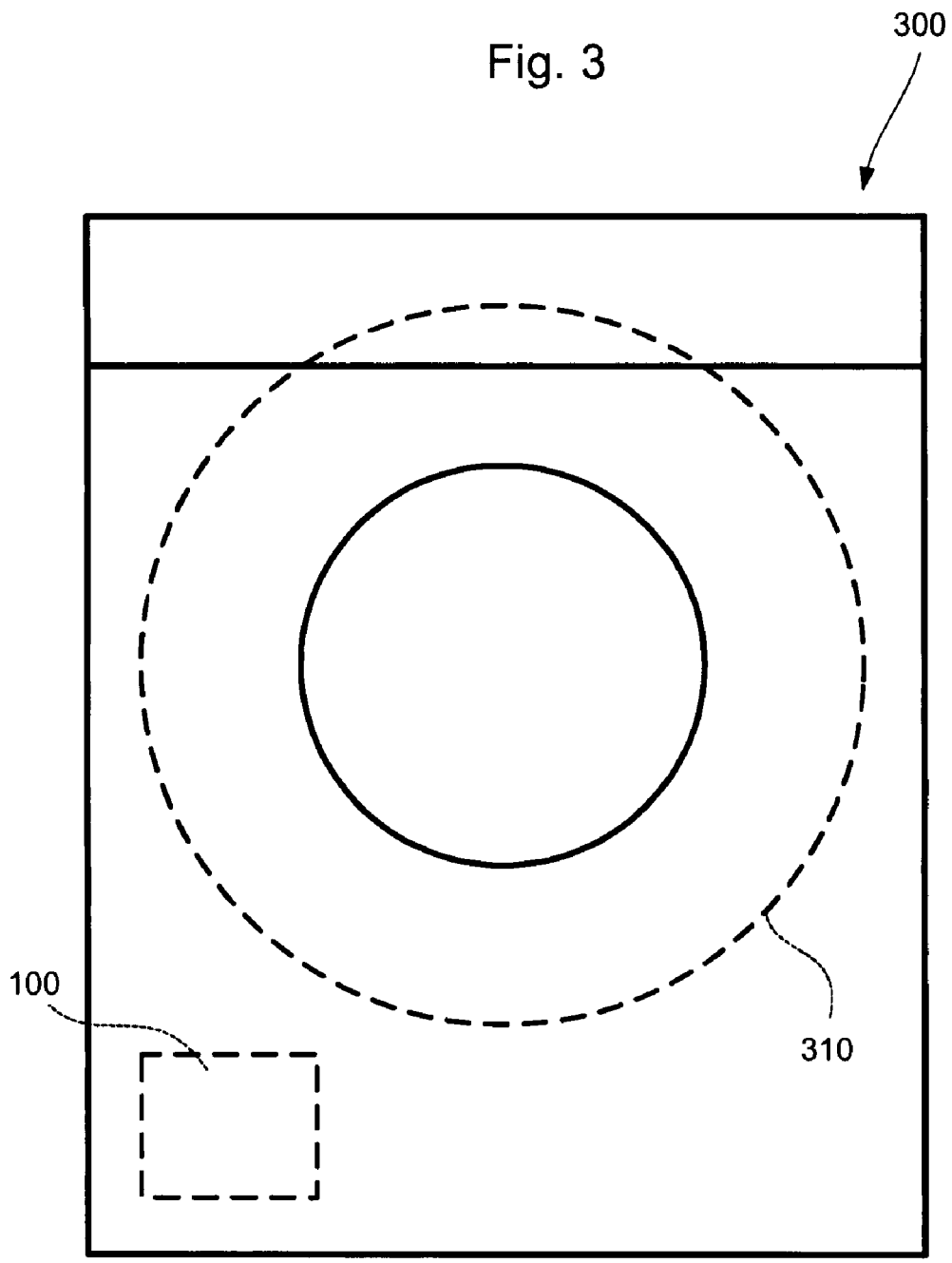

The motor 112 is used to drive a fan 200 for instance, which, on its part, is used to generate a flow of air, preferably in a laundry dryer 300 (see FIG. 3).

The second current path 120 includes a series circuit consisting of a first heater 122 and a protective switch 124 for disconnecting the second heater 122 from a power supply (~), in other words for disconnecting the heater in the event of overheating. With the installation of the electric switching circuit in the laundry dryer 300, the first heater 122 is used to heat the flow of air L generated by the fan 200. The flow of air is used in the laundry dryer 300 to dry laundry.

In accordance with the invention, the second current path 120 includes, aside from the protective switch 124, another protective switch 116b, which is similarly designed as a bimetallic switch. While the protective switch 124 detects the actual temperature of the first heater 122 in each instance and is used to disconnect the first heater 122 from the power supply (+) with an imminent overheating, the switch 116b is used to connect or disconnect the first heater 122 to/from the power supply as a function of the actual operating state of the electric motor 112 in the first current path 110. In accordance with the invention, the actual operating state of the electric motor is detected with the aid of a second heater 116a assigned to the bimetallic switch 116b.

For this purpose, with the first exemplary embodiment shown in FIG. 1, the second heater 116a is also connected in series to the electric motor 112 and the protective circuit 114 in the first current path 110. This ensures that during the operation of the electric motor 112, the second heater 116a is always supplied with the same current as the electric motor 112. The heat generated by the second heater 116a in this way directly affects the bimetallic switch 116b with the desired result that this switch 116b closes the second current path 120 and thus stops the first heater 122 from operating (open contact or NO contact).

If, to this end, the first current path 110 is alternatively interrupted by the protective switch 114 for instance, with the consequence that the electric motor 112 is in an operating state "switched-off", current no longer flows through the second heater 116a, with the result that the bimetallic switch 116b cools and interrupts the second current path 120. It is herewith important for the second heater 116a and the bimetallic switch 116b to be constructively attuned to one another so that the bimetallic switch 116b only opens and closes under very precise conditions. Allowances should be made for the radiation of a switch housing when positioning the switch and the second heater.

In some instances of the first exemplary embodiment of the electric switching circuit according to the invention, a long reaction time adhering to this example as well as only indirect monitoring of the flow of air of the fan needed to cool the heater can interfere.

Figure 2:
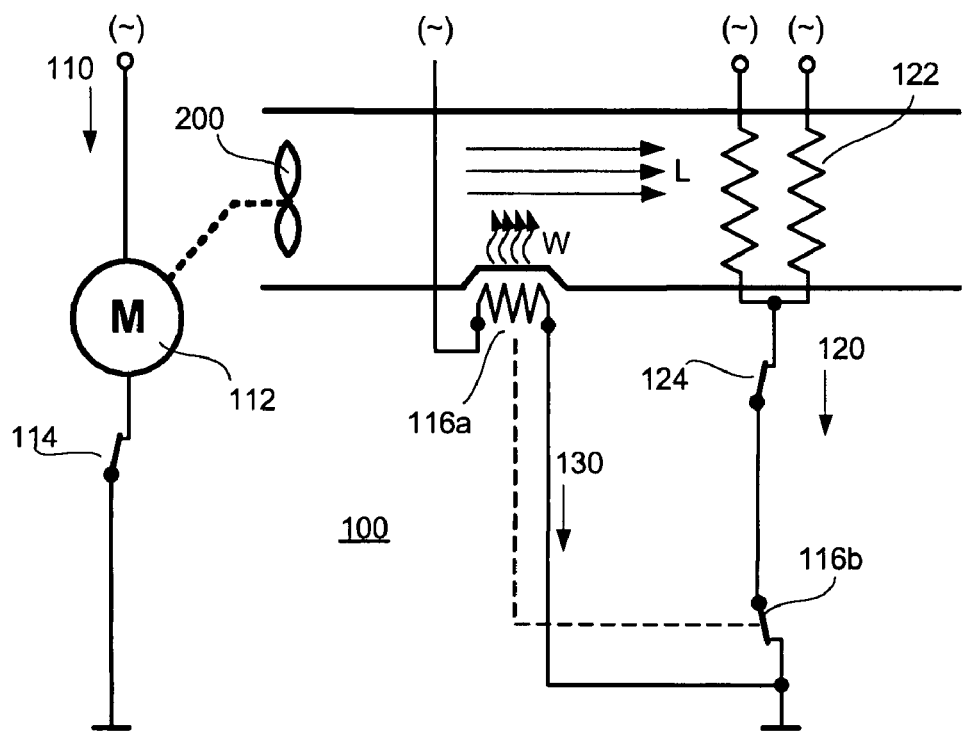
FIG. 2 shows a second exemplary embodiment of the electric switching circuit according to the invention and FIG. 3 shows a laundry dryer with the electric switching circuit according to the invention

A second exemplary embodiment for the electric switching circuit 100 according to the invention, which overcomes these characteristics, is thus shown in FIG. 2. These characteristics are generally overcome in such a way that the second heater 116a is not operated in the first current path, but is instead operated independently of the first and second current path by way of a third current path 130 and is arranged in the flow or air generated by the fan 200.

The third current path is in series with the main switch of a device, for instance of the laundry dryer 300, in which the electric switching circuit 100 is operated. This ensures that the second heater 116a is continuously powered provided the device is connected. By virtue of its continuously similar current supply, the second heater 116a basically generates a constant heat W. As a result of the arrangement of the second heater 116a according to the second exemplary embodiment in the flow of air, a part of the heat W generated by the second heater 116a is however generally removed from the flow of air of the fan 200 and thus does not reach the ambient of the bimetallic switch 116b. In other words, the opening and closing of the bimetallic switch 116b is controlled by the function of the fan 200 and the motor 112 by virtue of its thermal coupling with the flow of air. In more precise terms, in the case of a properly operating fan 200 and motor 112, the heat W generated by the second heater 116a is at least partially dissipated by the flow of air from the ambient of the bimetallic switch, so that this remains relatively cold. In contrast to the first exemplary embodiment, with the second exemplary embodiment the bimetallic switch 116b is preferably connected as a break contact or NC contact, so that it closes the second current path in the case of relatively low ambient temperatures and in this way stops the first heater 122 from operating.

If, however, by contrast, the motor 112 or the fan 200 fail, resulting in the therewith weakened and/or completely absent flow of air no longer being able to dissipate the heat generated by the second heater 112 from the ambient of the bimetallic switch 116b, the switch 116b opens the second current path. The first heater 122 is then disconnected and is prevented from an imminent overheating by virtue of the weakened and/or absent flow of air. This disconnection by way of switches 116b is advantageously already carried out before the overload switch 124 has recognized an increased temperature of the first heater 122. The bimetallic switch 116b, together with the second heater 116a assigned thereto, can advantageously react directly to critical states of the flow of air, in other words to a reduction, an interruption or a reverse in the flow of air, as a result of pressure fluctuations. The bimetallic switch 116b must be designed such that on the one hand it also safely triggers at low temperatures but on the other hand it is also not destroyed at the highest possible process air temperature.

As shown in FIG. 3, the circuit 100 according to the invention is preferably used in a laundry dryer 300 with a washing drum 310 and is used there to protect the first heater 122 for heating the flow of air in order to dry the laundry against overheating.

The invention claimed is:

1. An electric switching circuit comprising:
    a first current path including an electric motor;
    a second current path including a first heater and a switch connected in series with the first heater for opening or closing the second current path in response to an actual operating state of the electric motor, wherein the switch is designed as a bimetallic switch; and
    a second heater assigned to the bimetallic switch and disposed in a different current path to the first heater to detect the actual operating state of the electric motor and to control the bimetallic switch by changing its ambient temperature in response to the detected operating state.

2. The switching circuit as claimed in claim 1, further comprising a fan driven by the electric motor for generating a flow of air which is heated by the first heater.

3. The switching circuit as claimed in claim 1, wherein the second heater in the first current path is connected in series to the electric motor.

4. The switching circuit as claimed in claim 2, wherein the second heater is installed in a third current path and is arranged in the flow of air of the fan such that the heat generated by the second heater is at least partially removed from the flow of air and thus does not affect and/or only affects the bimetallic switch in a restricted manner.

5. The switching circuit as claimed in claim 4, wherein the third current path is powered continuously.

6. The switching circuit as claimed in claim 1, wherein the second heater and the bimetallic switch are integrated in a component.

7. The switching circuit as claimed in claim 4, wherein at least two of the three current paths are connected in parallel to one another between a common voltage potential and earth.

8. A laundry dryer comprising:
a drum providing an area for drying laundry;
a fan for generating a flow of air through the drum,
a first current path including an electric motor;
a second current path including a first heater and a switch connected in series with the first heater for opening or closing the second current path in response to an actual operating state of the electric motor, wherein the switch is designed as a bimetallic switch;
a second heater assigned to the bimetallic switch and disposed in a different current path to the first heater to detect the actual operating state of the electric motor and to control the bimetallic switch by changing its ambient temperature in response to the detected operating state; and
wherein the electric motor drives the fan and the first heater heats the flow of air through the drum.

9. The switching circuit as claimed in claim 8, wherein the second heater in the first current path is connected in series to the electric motor.

10. The switching circuit as claimed in claim 8, wherein the second heater is installed in a third current path and is arranged in the flow of air of the fan such that the heat generated by the second heater is at least partially removed from the flow of air and thus does not affect and/or only affects the bimetallic switch in a restricted manner.

11. The switching circuit as claimed in claim 10, wherein the third current path is powered continuously.

12. The switching circuit as claimed in claim 8, wherein the second heater and the bimetallic switch are integrated in a component.

13. The switching circuit as claimed in claim 10, wherein at least two of the three current paths are connected in parallel to one another between a common voltage potential and earth.

14. A method for operating a laundry dryer comprising a fan for generating a flow of air for drying laundry, an electric motor driving the fan, and a first heater, the method comprising the following acts:
heating a flow of air with the aid of the first heater;
detecting the actual operating state of the electric motor and
connecting and disconnecting the first heater in response to the detected operating state, wherein the actual operating state is detected with the aid of a second heater which is disposed in a different current path to the first heater, and the connection or disconnection is carried out with the aid of a bimetallic switch by setting the ambient temperature of the bimetallic switch with the aid of the second heater in response to the detected actual operating state.

* * * * *